Nov. 30, 1954     R. E. CHRISTIAN     2,695,452
DENTAL TOOL
Filed June 9, 1953
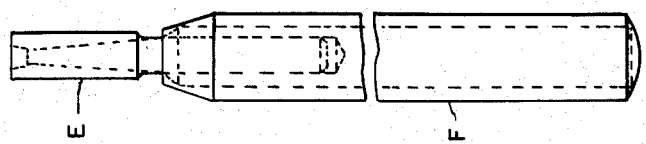
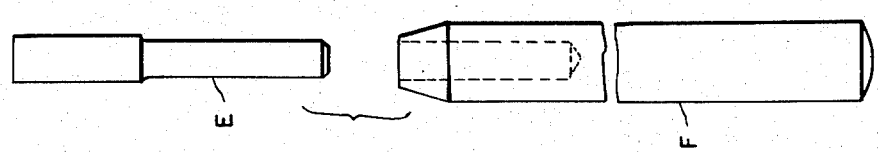
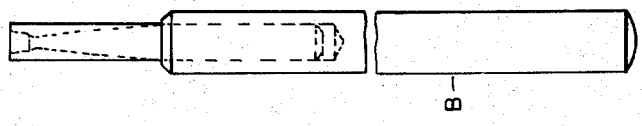
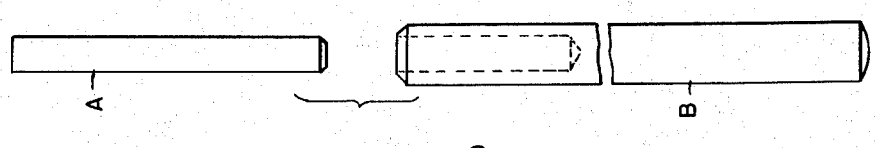
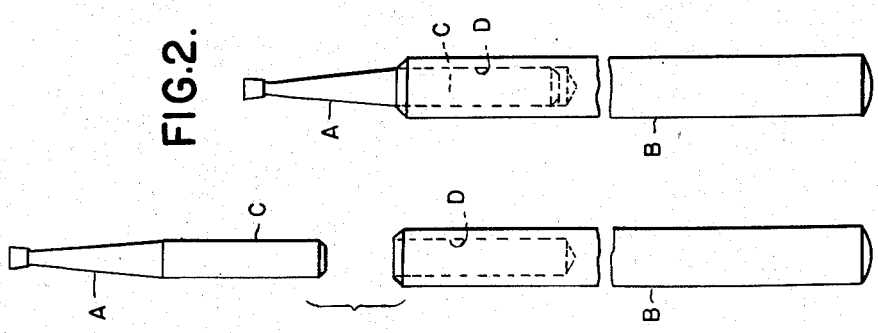
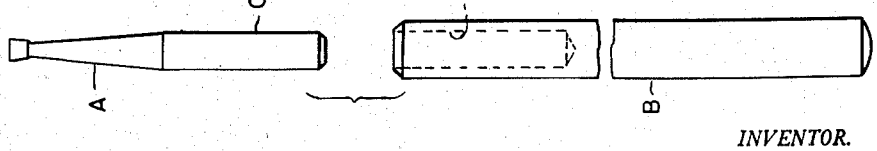
*INVENTOR.*
RODNEY E. CHRISTIAN
BY
*Whittemore Hulbert & Belknap*
ATTORNEYS

United States Patent Office 2,695,452
Patented Nov. 30, 1954

2,695,452

DENTAL TOOL

Rodney E. Christian, Dearborn, Mich., assignor to Kerr Manufacturing Company, Detroit, Mich., a corporation of Michigan Application June 9, 1953, Serial No. 360,567

4 Claims. (Cl. 32—48)

The invention relates to dental tools and more particularly to tools in which the cutter portion is formed of very hard material, such as tungsten carbide or other carbides. This application forms a continuation-in-part of my pending application Serial No. 166,125, filed June 5, 1950, now abandoned. In the manufacture of such tools great difficulty is experienced in securely uniting the carbide cutter with the material forming the shank or holder for the tool. Such difficulty is due both to the nature of the materials used and also because of their extremely small dimensions. Thus methods suitable for use with tools of larger dimensions, or with other materials, may be unsuccessful if applied to this particular problem. One method which has been heretofore used is to secure the carbide to the shank by butt brazing. This, however, does not produce a strong enough bond to withstand all of the stresses to which the tool may be subjected. The forming of a purely mechanical joint is also difficult for the reason above given that the dimensions of the parts are so small.

It is the object of the instant invention to obtain a construction in which the carbide element is very securely fastened to the shank and will continue in this condition throughout the life of the tool.

It is a further object to produce a tool of this type that will be superior in its operation to those heretofore produced.

With these and other advantages in view, the invention consists in the construction as hereinafter set forth:

In the drawings:

Fig. 1 is a side elevation drawn to an enlarged scale of one form of carbide cutter and shank therefor before assembly;

Fig. 2 is a similar view of the assembled structure;

Figs. 3 and 4 are views similar to Figs. 1 and 2 illustrating a modified construction and method of forming the same;

Figs. 5 and 6 are similar views of still another modification.

Certain carbides, and particularly tungsten carbide, are extremely hard substances being in fact next to the diamond in degree of hardness. This material is formed of sintered graunles and, because of its hardness can be fashioned only by the use of diamond cutters. The advantage of using such material in dental tools is that the enamel of human teeth is sometimes very hard and, in fact harder than any tempered steel tool. Thus with different specific dental tools such as burs, reamers, files, etc., it would be advantageous to form the cutting element of carbide. It is, however, necessary that the cutter should be mounted in a holder adapting it for use with dental machines or manually operated tools. Thus, as shown in Figs. 1 and 2, the carbide cutter member A, in this case a bur, must be secured to a shank member B of cylindrical form and should be accurately aligned therewith. If secured by butt brazing such accurate alignment is difficult and, moreover, the strength of the bond is not as great as desirable. I have therefore united the member A to the member B by providing the former with a cylindrical insert portion C which is pressed into a cylindrical socket D in the member B originally of smaller internal diameter than the external diameter of the insert. The dimensions of these members are very small, the diameter of the insert being only approximately one sixteenth of an inch and not more than one quarter of an inch in length so that the area of contact between the two members is only .05 of a square inch. The holding power of the joint is determined by the area of contact times the radial pressure per unit area. Consequently with such limited contact area an extremely high pressure is required and very much greater than is customary with press fits. This greater pressure I obtain by increasing the differential or excess diameter of the insert over that of the socket to correspondingly increase the expansion and circumferential tensioning of the socket wall while maintaining the same safely within the ultimate elastic limit (yield point) of the material and having also in mind the additional stresses to which the tool may be subjected in the performance of its work. Preferably the member B is formed of stainless steel with its cylindrical socket of an original internal diameter .059±.0005 of an inch. The diameter of the insert portion of the member A is .061±.0005 of an inch which makes a differential or excess diameter of from .001 to .003 of an inch and a ratio of diameter of the socket to that of the insert from 95% to 98%. This will develop sufficient friction to hold said members from relative displacement by any force less than from 235 to 250 pounds which is more than any displacement force which will be developed in the operation of the tool. The external diameter of the shank B in the finished tool is approximately .092 of an inch which makes the wall thickness of the socket .016 of an inch.

In the construction just described, the carbide cutter was fashioned prior to its engagement with the shank or holder. I prefer, however, to first assemble the carbide element with the shank and subsequently fashion the cutter to the desired form. Such construction is illustrated in Figs. 3 and 4 and also in Figs. 5 and 6. In the latter case both the carbide element E and the shank F are formed of greater diameters than in the finished tool and both are subsequently reduced to the proper size.

This last method will result in the more accurate forming of the tool as both the cutter and the shank will be concentric to the same axis.

The method of fashioning the carbide cutter is not a part of the instant invention, and it will be sufficient to say that it is accomplished by a diamond cutter and preferably one in which diamond particles are held together by a matrix body.

Tungsten carbide is very brittle and is also expensive. For this reason it is impractical to make the whole dental tool of the carbide, and in the construction as above described the carbide element is the smaller part of the whole structure.

What I claim as my invention is:

1. A dental bur comprising a metallic shank element having a cylindrical socket therein, and a cutter element formed of metallic carbide having a cylindrical insert portion pressed into and expanding said socket, the ratio of the original diameter of said socket and that of said insert being between 95% and 98%.

2. The construction as in claim 1 in which the diameter of the insert portion is between .0605 and .0615 of an inch and the original diameter of the socket is between .0585 and .0595 of an inch.

3. The construction as in claim 2 in which the shank element is formed of stainless steel and the cutter element is formed of tungsten carbide which is non-deformable by the pressure of said socket.

4. The construction as in claim 3 in which the length of the insert portion of said cutter is approximately .25 of an inch and the total area of contact between said insert and socket is not more than .05 of a square inch.

No references cited.